(12) United States Patent
Cohen

(10) Patent No.: US 9,935,503 B2
(45) Date of Patent: Apr. 3, 2018

(54) RADIATIVE TRANSFER AND POWER CONTROL WITH FRACTAL METAMATERIAL AND PLASMONICS

(71) Applicant: Fractal Antenna Systems, Inc., Burlington, MA (US)

(72) Inventor: Nathan Cohen, Belmont, MA (US)

(73) Assignee: Fractal Antenna Systems, Inc., Bedford, MA (US)

( * ) Notice: Subject to any disclaimer, the term of this patent is extended or adjusted under 35 U.S.C. 154(b) by 0 days.

(21) Appl. No.: 15/583,137

(22) Filed: May 1, 2017

(65) Prior Publication Data

US 2017/0237300 A1 Aug. 17, 2017

Related U.S. Application Data

(63) Continuation of application No. 15/201,888, filed on Jul. 5, 2016, now Pat. No. 9,638,479, which is a (Continued)

(51) Int. Cl.
*H02J 7/00* (2006.01)
*H02J 50/40* (2016.01)
(Continued)

(52) U.S. Cl.
CPC ............... *H02J 50/40* (2016.02); *F28F 7/00* (2013.01); *F41H 3/00* (2013.01); *F28F 2245/06* (2013.01)

(58) Field of Classification Search
CPC ...................................................... H02J 50/40
(Continued)

(56) References Cited

U.S. PATENT DOCUMENTS 5,250,950 A 10/1993 Scherrer et al.
6,642,881 B1 11/2003 Lawrence et al.
(Continued)

FOREIGN PATENT DOCUMENTS

KR 10-2010-0072382 7/2010
WO WO2011/138670 A2 11/2011
WO WO2014/05573 A1 4/2014

OTHER PUBLICATIONS

Korean International Searching Authority (ISA/KIPO); 2014; International Search Report and Written Opinion, dated Jan. 23, 2014, from PCT Application PCT/US2013/062940 (published as WO 2014/05573 A1).

*Primary Examiner* — Stephen W Jackson
(74) *Attorney, Agent, or Firm* — McDermott Will & Emery LLP

(57) ABSTRACT

Systems according to the present disclosure provide one or more surfaces that function as heat or power radiating surfaces for which at least a portion of the radiating surface includes or is composed of "fractal cells" placed sufficiently closed close together to one another so that a surface (plasmonic) wave causes near replication of current present in one fractal cell in an adjacent fractal cell. A fractal of such a fractal cell can be of any suitable fractal shape and may have two or more iterations. The fractal cells may lie on a flat or curved sheet or layer and be composed in layers for wide bandwidth or multibandwidth transmission. The area of a surface and its number of fractals determines the gain relative to a single fractal cell. The boundary edges of the surface may be terminated resistively so as to not degrade the cell performance at the edges.

8 Claims, 6 Drawing Sheets

Related U.S. Application Data continuation of application No. 14/043,781, filed on Oct. 1, 2013, now Pat. No. 9,482,474.

(60) Provisional application No. 61/744,651, filed on Oct. 1, 2012.

(51) Int. Cl.
*F28F 7/00* (2006.01)
*F41H 3/00* (2006.01)

(58) Field of Classification Search
USPC .......................................................... 307/147
See application file for complete search history.

(56) References Cited

U.S. PATENT DOCUMENTS

| | | | |
|---|---|---|---|
| 6,876,320 B2 | 4/2005 | Puente Ballarda | |
| 7,102,814 B1 | 9/2006 | Hughes | |
| 7,256,751 B2 | 8/2007 | Cohen | |
| 7,301,493 B1 | 11/2007 | Canales et al. | |
| 7,994,962 B1 | 8/2011 | Ben-Shmuel | |
| 8,253,639 B2 | 8/2012 | Cohen | |
| 8,378,877 B2 | 2/2013 | Tishin et al. | |
| 8,610,617 B1 | 12/2013 | Avouris et al. | |
| 8,860,607 B2 * | 10/2014 | Shamim | G01S 7/03 342/175 |
| 8,878,741 B2 | 11/2014 | Mosallaei | |
| 8,917,210 B2 * | 12/2014 | Dang | H01Q 1/2283 343/700 MS |
| 9,134,465 B1 | 9/2015 | Cohen | |
| 2007/0028958 A1 * | 2/2007 | Retti | B60L 5/005 136/244 |
| 2009/0135042 A1 | 5/2009 | Umishita et al. | |
| 2009/0207087 A1 | 8/2009 | Fang et al. | |
| 2010/0288116 A1 | 11/2010 | Cincotti et al. | |
| 2011/0063189 A1 | 3/2011 | Cohen et al. | |

\* cited by examiner

RADIATIVE TRANSFER AND POWER CONTROL WITH FRACTAL METAMATERIAL AND PLASMONICS

RELATED APPLICATION

This application is a continuation of U.S. application Ser. No. 15/201,888, filed Jul. 5, 2016, which is a continuation of U.S. application Ser. No. 14/043,781, filed Oct. 1, 2013, which claims the benefit of U.S. Provisional Patent Application No. 61/744,651 filed Oct. 1, 2012. The entire contents of all of which applications are incorporated herein by reference.

BACKGROUND

Effective thermal management is a concern in many industries and for various types of consumer goods. For example, heat build-up in a computer's central processing unit (CPU) can degrade the computer's performance just as heat build-up (or "heat soak") in an automobile's brakes or engine can degrade the automobile's performance. Many machines and devices have performance limits that are often defined by how well heat developed during operation is managed. Such heat build-up is often a byproduct of power transmission and use.

Some common thermal management techniques rely on convective heat transfer. Convective heat transfer, often referred to simply as convection, is the transfer of heat from one place to another by the movement of fluids. Convection is usually the dominant form of heat transfer in liquids and gases. Convection can be "forced" by movement of a fluid by means other than buoyancy forces (for example, a water pump in an automobile engine). For machinery and electronic components, convective cooling is typically employed.

A heat pipe or heat pin is a heat-transfer device that combines the principles of both thermal conductivity and phase transition to efficiently manage the transfer of heat between two solid interfaces. At the hot interface of a heat pipe a liquid in contact with a thermally conductive solid surface turns into a vapor by absorbing heat from that surface. The vapor then travels along the heat pipe to the cold interface and condenses back into a liquid releasing the latent heat. The liquid then returns to the hot interface through either capillary action or gravity, and the cycle repeats. Consumer electronics such as personal computers often utilized heat pipes for cooling processing units.

Since they rely on fluids as media to transport heat, such convective and heat-pipe cooling techniques can present issues relating to management (e.g., containment and pumping) of the fluids, and may not be appropriate for some applications.

Thermoelectric cooling employs the Peltier effect to create a heat flux between the junction of two different types of materials. The Peltier effect is the presence of heating or cooling at an electrified junction of two different conductors and is named for French physicist Jean Charles Athanase Peltier, who discovered it in 1834. When a current is made to flow through a junction between two conductors A and B, heat may be generated (or removed) at the junction. A Peltier cooler, heater, or thermoelectric heat pump is a solid-state active heat pump which transfers heat from one side of the device to the other, with consumption of electrical energy, depending on the direction of the current. Such an instrument is also called a Peltier device, Peltier heat pump, solid state refrigerator, or thermoelectric cooler (TEC). They can be used either for heating or for cooling (refrigeration) although in practice the main application is cooling. It can also be used as a temperature controller that either heats or cools*

Thermoelectric cooling is reliant on supplied electricity for the cooling effect and consequently may not be desirable for some applications.

SUMMARY

The present disclosure is directed to systems and techniques that provide for desired transfer of radiation by using close packed arrangements of resonators having fractal shapes, i.e., "fractal cells." Systems and techniques according to the present disclosure provide one or more surfaces that act or function as heat or power radiating surfaces for which at least a portion of the radiating surface includes or is composed of "fractal cells" (small fractal shapes) (as antennas or resonators) placed sufficiently closed close together to one another (e.g., less than ½₀ wavelength) so that a surface (plasmonic) wave causes near replication of current present in one fractal cell in an adjacent fractal cell. A fractal of such a fractal cell can be of any suitable fractal shape and may have two or more iterations. The fractal cells may lie on a flat or curved sheet or layer and be composed in layers for wide bandwidth or multibandwidth transmission. The area of a surface (e.g., sheet) and its number of fractals determines the gain relative to a single fractal cell. As each cell is fed plasmonicly rather than directly, 'dead' or covered or out of resonance cells do not alter the ability of the other cells to work. The boundary edges of the surface may be terminated resistively so as to not degrade the cell performance at the edges. These surfaces may be referred to as fractal plasmonic surfaces (FPS's) and can provide benefits for thermal management and/or power delivery.

Such a fractal plasmonic surface (FPS) may be used to transfer radiation, e.g., via evanescent wave transfer. In doing so such surfaces can be used to remove radiative power and/or heat from one location to another, or divert it to another location. Such surfaces may be used to essentially diffuse power delivered to a part of the FPS and dissipate and or distribute it to other specific parts or globally. Heat for example, may be dissipated in this way, or a power "hotspot" supplied or hit with localized power may have the power spread out or diverted to other desired locations, e.g., different areas of a related machine or structure. In some embodiments, a FPS on a closed or curved surface may act as a cloaking device to divert power (in a wavelength or frequency of interest) from one side of the device to the other. In other embodiments, a refrigeration or cooling effect may be induced by transferring heat away from a FPS.

Exemplary embodiments of the present disclosure can provide techniques, including systems and/or methods, for cloaking objects at certain wavelengths/frequencies or over certain wavelength/frequency ranges (bands). Such techniques can provide an effective electromagnetic lens and/or lensing effect for certain wavelengths/frequencies or over certain wave-length/frequency ranges (bands).

In some embodiments, the effects produced by such techniques can include cloaking or so-called invisibility of the object(s) at the noted wavelengths or bands. Representative frequencies of operation can include, but are not limited to, those over a range of 500 MHz to 1.3 GHz, though others may of course be realized. Operation at other frequencies, including for example those of visible light, infrared, ultraviolet, and as well as microwave EM radiation, e.g., K, Ka, X-bands, etc. may be realized, e.g., by appropriate scaling of dimensions and selection of shape of the resonator elements.

Exemplary embodiments of the present disclosure can include a novel arrangement of resonators in a lattice-like configuration. The arrangements can include resonators of several different sizes and/or geometries arranged so that each size or geometry ("grouping") corresponds to a moderate or high quality factor, "Q," (that is moderate or low bandwidth) response that resonates within a specific frequency range.

For exemplary embodiments, fractal resonators can be used for the resonators in such structures because of their control of passbands, and smaller sizes compared to non-fractal based resonators. Their benefit arises from a size standpoint because they can be used to shrink the resonator(s), while control of passbands can reduce or eliminates issues of haunonic pass-bands that would resonate at frequencies not desired.

Further embodiments of the present disclosure are directed to scatterer or scattering structures. Additional embodiments of the present disclosure are directed to structures/techniques for activating and/or deactivating cloaking structures. Further embodiments of the present disclosure are directed to wideband absorbers.

It should be understood that other embodiments of FPS systems and methods according to the present disclosure will become readily apparent to those skilled in the art from the following detailed description, wherein exemplary embodiments are shown and described by way of illustration. The systems and methods of the present disclosure are capable of other and different embodiments, and details of such are capable of modification in various other respects. Accordingly, the drawings and detailed description are to be regarded as illustrative in nature and not as restrictive.

BRIEF DESCRIPTION OF THE DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
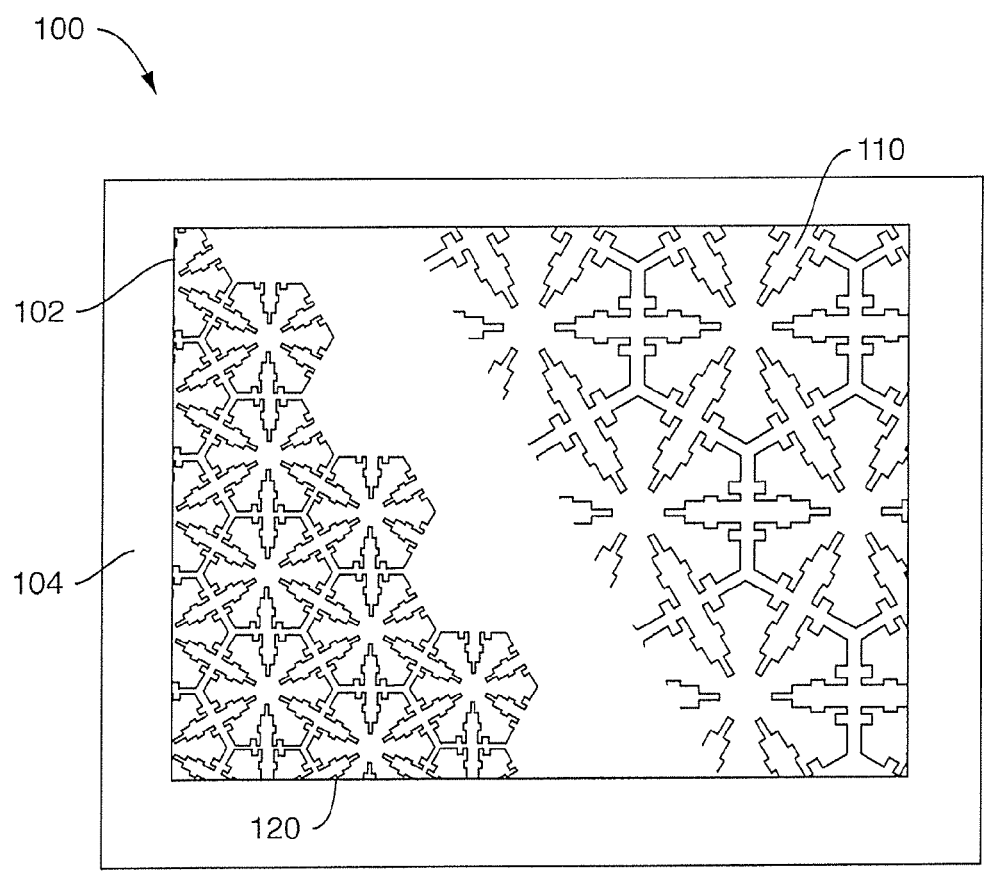
FIG. 1 depicts a diagrammatic plan view of a fractal plasmonic surface (FPS), in accordance with exemplary embodiments of the present disclosure.

While certain embodiments depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

Systems and techniques according to the present disclosure provide for desired transfer of radiation by using close packed arrangements of resonators having fractal shapes, i.e., "fractal cells." Systems and techniques according to the present disclosure provide one or more surfaces that act or function as heat or power radiating surfaces for which at least a portion of the radiating surface includes or is composed of "fractal cells" (small fractal shapes) (as antennas or resonators) placed sufficiently close to one another (e.g., less than ½₀ wavelength) so that a surface (plasmonic) wave causes near replication of current present in one fractal cell in an adjacent fractal cell. A fractal of such a fractal cell can be of any suitable fractal shape and may have two or more iterations. The fractal cells may lie on a flat or curved sheet or layer and be composed in layers for wide bandwidth or multibandwidth transmission. The area of a surface (e.g., sheet) and its number of fractals determines the gain relative to a single fractal cell. As each cell is fed plasmonicly rather than directly, "dead" or covered or out of resonance cells do not alter the ability of the other cells to work. The boundary edges of the surface may be terminated resistively so as to not degrade the cell performance at the edges. These surfaces may be referred to as fractal plasmonic surfaces (FPS's).

Such a fractal plasmonic surface (FPS) may be used to transfer radiation, e.g., via evanescent wave transfer. In doing so such surfaces can be used to remove radiative power and/or heat from one location to another, or divert it to another location. Such surfaces may be used to essentially diffuse power delivered to a part of the FPS and dissipate and or distribute it to other specific parts or globally. Heat for example, may be dissipated in this way, or a power "hotspot" supplied or hit with localized power may have the power spread out or diverted to other desired locations, e.g., different areas of a related machine or structure. In some embodiments, a FPS on a closed or curved surface may act as a cloaking device to divert power (in a wavelength or frequency of interest) from one side of the device to the other. In other embodiments, a refrigeration or cooling effect may be induced by transferring heat away from a FPS.

In some ebodiments, power control may also be achieved through wideband absorption by placing a resistive sheet at the edge of the fractal cells, creating a layer adjacent to the cells. Impinging electromagnetic radiation will be absorbed and not reflected or scattered. A FPS may be used to wirelessly couple a device for power transmission by placing the power as electromagnetic radiation on the FPS and then physically placing the (to be) powered device closely to the FPS. A FPS may also work even if some of the cells are damaged or missing as a variety of paths exist to convey the plasmonic transmission. A FPS may also be used to diffuse power away from one location to another or dissipate it so as to decrease "hotspots." Heating and cooling as a wideband speed of light heat-like pipe may also be done with the FPS.

Exemplary embodiments of the present disclosure can provide techniques, including systems and/or methods, for cloaking objects at certain wavelengths/frequencies or over certain wavelength/frequency ranges (bands). Such techniques can provide an effective electromagnetic lens and/or lensing effect for certain wavelengths/frequencies or over certain wave-length/frequency ranges (bands). In some embodiments, the effects produced by such techniques can include cloaking or so-called invisibility of the object(s) at the noted wavelengths or bands. Representative frequencies of operation can include, but are not limited to, those over a range of 500 MHz to 1.3 GHz, though others may of course be realized. Operation at other frequencies, including for example those of visible light, infrared, ultraviolet, and as well as microwave EM radiation, e.g., K, Ka, X-bands, etc. may be realized, e.g., by appropriate scaling of dimensions and selection of shape of the resonator elements.

Exemplary embodiments of the present disclosure can include a novel arrangement of resonators in a lattice-like configuration. The arrangements can include resonators of several different sizes and/or geometries arranged so that each size or geometry ("grouping") corresponds to a moderate or high quality factor, "Q," (that is moderate or low bandwidth) response that resonates within a specific frequency range.

For exemplary embodiments, fractal resonators can be used for the resonators in such structures because of their control of passbands, and smaller sizes compared to non-fractal based resonators. Their benefit arises from a size standpoint because they can be used to shrink the resonator(s), while control of passbands can reduce or eliminates issues of harmonic pass-bands that would resonate at frequencies not desired.

Further embodiments of the present disclosure are directed to scatterer or scattering structures. Additional embodiments of the present disclosure are directed to structures/techniques for activating and/or deactivating cloaking structures.

Related fractal technology is described in the following: (i) U.S. Provisional Patent Application No. 61/163,824, filed 26 Mar. 2009 and entitled "Cloaking Techniques"; (ii) U.S. Provisional Patent Application No. 61/163,837, filed 26 Mar. 2009 and entitled "Scatterer"; (iii) U.S. Provisional Patent Application No. 61/163,913, filed 27 Mar. 2009 and entitled "Cloaking Techniques"; and, (iv) U.S. Provisional Patent Application No. 61/237,360, filed 27 Aug. 2009 and entitled "Switching System for Cloak On Command"; the entire contents of all of which applications are incorporated herein by reference.

For exemplary embodiments, fractal resonators can be used for the resonators because of their control of passbands, and smaller sizes. A main benefit of such resonators arises from a size standpoint because they can be used to shrink the resonator(s), while control of pass-bands can reduce/mitigate or eliminate issues of harmonic passbands that would resonate at frequencies not desired.

Exemplary embodiments of a resonator system for use at infrared (or nearby) frequencies can be built from belts or loops having fractal cells on one or both sides. These belts or loops can function to slip the infrared (heat) energy around an object located within the belts, so the object is effectively invisible and "see thru" at the infrared frequencies. Belts, or shells, having similar closed-packed arrangements for operation at a first passband can be positioned within a wavelength of one another, e.g., 1/10 k, 1/8 k, 1/4 k, 1/2 k, etc.

In cloak embodiments, as described in further detail below, an observer can observe an original image or signal, without it being blocked by the cloaked object. Using no power, the fractal cloak having FPS can replicate the original signal (that is, the signal before blocking) with great fidelity. Exemplary embodiments can function in the infrared region (e.g., ~700 nm to ~1 mm, corresponding to ~430 THz to ~300 GHz), providing 3:1 bandwidth; operation within or near such can frequencies can provide other bandwidths as well, such as 1:1 up to 2:1 and up to about 3:1.

FIG. 1 depicts a radiative system 100 having a fractal plasmonic surface (FPS), in accordance with the present disclosure. The FPS 102 includes a close packed arrangements of resonators having fractal shapes (e.g., "fractal cells") as denoted by 110 and 120. The FPS 102 may be part of a larger surface or area 104. The individual fractal cells are separated from the adjacent fractal cells but are sufficiently close to one another (e.g., less than 1/20 wavelength) so that a surface (plasmonic) wave causes near replication of current present in one fractal cell in an adjacent fractal cell. While preferred fractal shapes are shown in FIG. 1 as being hexagonal or snowflake-like, any suitable fractal shape (e.g., deterministic) may be used and such a fractal may have two or more iterations. The fractal cells may lie on a flat or curved sheet or layer and be composed in layers for wide bandwidth or multibandwidth transmission. Each layer holding a FPS can utilize fractal cells of different size and shape that those of another layer.

Examples of suitable fractal shapes (for use for shells and/or a scatting object) can include, but are not limited to, fractal shapes described in one or more of the following patents, owned by the assignee of the present disclosure, the entire contents of all of which are incorporated herein by reference: U.S. Pat. No. 6,452,553; U.S. Pat. No. 6,104,349; U.S. Pat. No. 6,140,975; U.S. Pat. No. 7,145,513; U.S. Pat. No. 7,256,751; U.S. Pat. No. 6,127,977; U.S. Pat. No. 6,476,766; U.S. Pat. No. 7,019,695; U.S. Pat. No. 7,215,290; U.S. Pat. No. 6,445,352; U.S. Pat. No. 7,126,537; U.S. Pat. No. 7,190,318; U.S. Pat. No. 6,985,122; U.S. Pat. No. 7,345,642; and, U.S. Pat. No. 7,456,799.

Other suitable fractal shape for the resonant structures can include any of the following: a Koch fractal, a Minkowski fractal, a Cantor fractal, a torn square fractal, a Mandelbrot, a Caley tree fractal, a monkey's swing fractal, a Sierpinski gasket, and a Julia fractal, a contour set fractal, a Sierpinski triangle fractal, a Menger sponge fractal, a dragon curve fractal, a space-filling curve fractal, a Koch curve fractal, an Lypanov fractal, and a Kleinian group fractal. While exemplary fractal shapes are shown in FIG. 1, the present disclosure is not limited to such and any other suitable fractal shapes (including generator motifs) may be used in accordance with the present disclosure.

The fractal cells 110 and 120 can be formed on the FPS 102 by any suitable techniques. Such techniques can include additive and/or subtractive techniques. Suitable lithography techniques may be used for some embodiments. In exemplary embodiments, the fractal shapes of the fractal cells 110 and 120 can be conductive traces that are deposited on the underlying surface, e.g., a suitable substrate. Any suitable deposition techniques can be utilized. In other embodiments, the fractal cells 110 and 120 can be etched or engraved onto a surface. Any suitable micromachining or nanomachining techniques may be used.

Exemplary embodiments of system 100 can utilize a material for a substrate that has low-loss characteristics in the infrared region to facilitate heat transfer by fractal cells disposed on, disposed in, or supported by the substrate, e.g., on a supporting surface provided by the substrate. Examples of suitable materials for such substrates can include, but are not limited to, the following: chalcogenide-glasses in general; high-purity As—S, As—Se, Ge—As—Se glasses; and, Ge30AsioSe3oTe30 glass, and the like.

Figure 2:
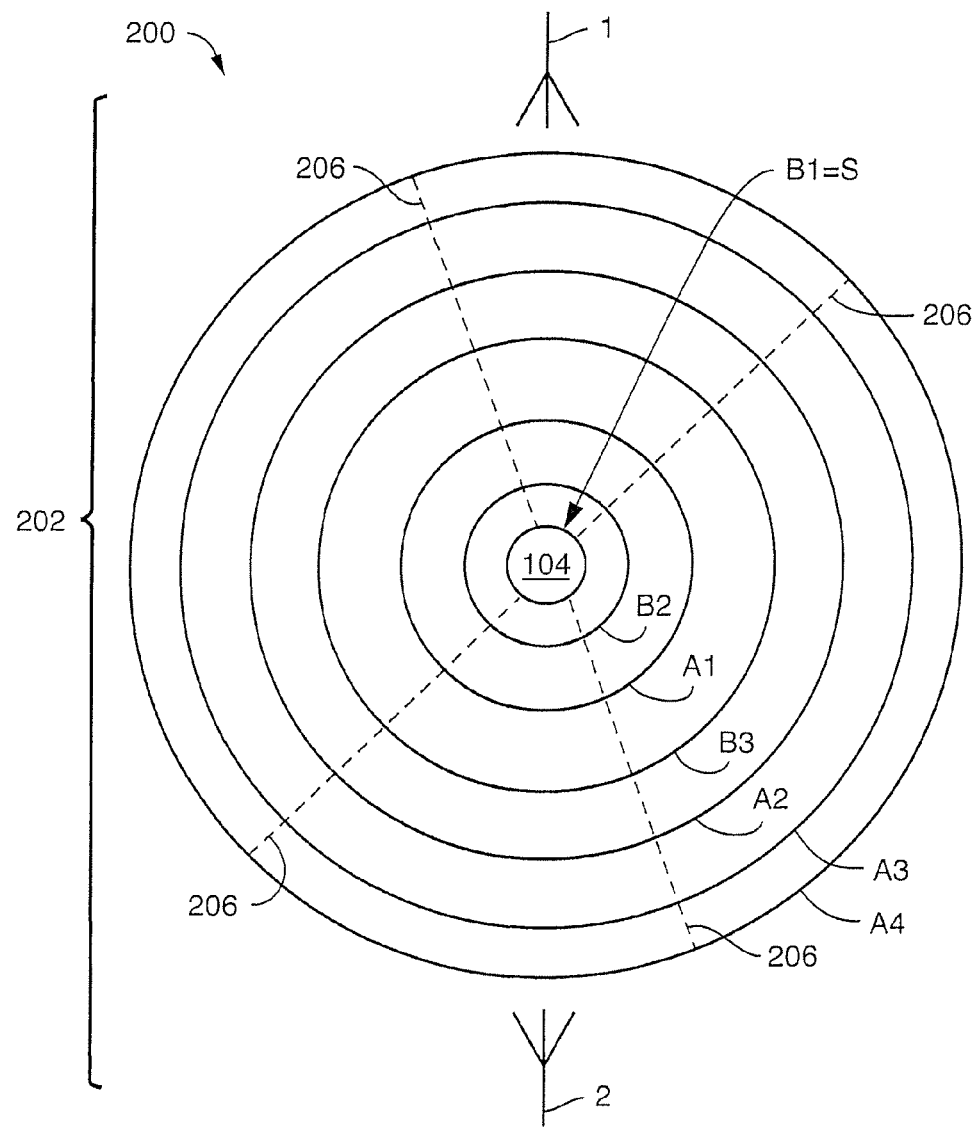
FIG. 2 depicts a diagrammatic plan view of a resonator cloaking system utilizing a number of cylindrical shells, in accordance with exemplary embodiments of the present disclosure.

FIG. 2 depicts a diagrammatic plan view of a cloaking system 200 and RF testing set up in accordance with exemplary embodiments of the present disclosure. As shown in FIG. 2, a number of concentric shells (or bands) 202 are placed on a platform (parallel to the plane of the drawing). The shells include a flexible substrate (e.g., polyimide with or without composite reinforcement) with conductive traces (e.g., copper, silver, etc.) in fractal shapes or outlines, each separate shape representing a fractal cell (e.g., similar to cells 110 and 120 of FIG. 1). The shells 202 surround an object to be cloaked (shown as 204 in FIG. 1). A transmitting antenna 1 and a receiving antenna 2 are shown at different sides of the system 200, for the purposes of illustration. The shells 202 can be held in place by suitable radial supports 206.

The shells indicated in FIG. 2 are of two types, one set (A1-A4) configured for optimal operation over a first wavelength/frequency range, and another set (B1-B3) configured for optimal operation over a second wavelength/frequency range. (The numbering of the shells is of course arbitrary and can be reordered, e.g., reversed.)

For an exemplary embodiment of system 200, the outer set of shells (A1-A4, with A1 being the innermost and A4 the outmost) had a height of about 3 to 4 inches (e.g., 3.5 inches) and the inner set of shells had a height of about 1 inch less (e.g., about 2.5 to 3 inches). The spacing between the shells with a larger fractal shape (A1-A4) was about 2.4 cm while the spacing between shells of smaller fractal generator shapes (B1-B3) was about 2.15 cm (along a radial direction). In a preferred embodiment, shell A4 was placed between shell B2 and B3 as shown. The resonators formed on each shell by the fractal shapes can be configured so as to be closely coupled (e.g., by capacitive and/or evanescent-wave coupling) and function to propagate energy by a plasmonic wave.

It will be appreciated that while, two types of shells and a given number of shells per set are indicated in FIG. 2, the number of shell types and number of shells for each set can be selected as desired, and may be optimized for different applications, e.g., wavelength/frequency bands, including the optical bands, i.e., infrared, visible, and ultraviolet, as well as x-ray.

Figure 3:
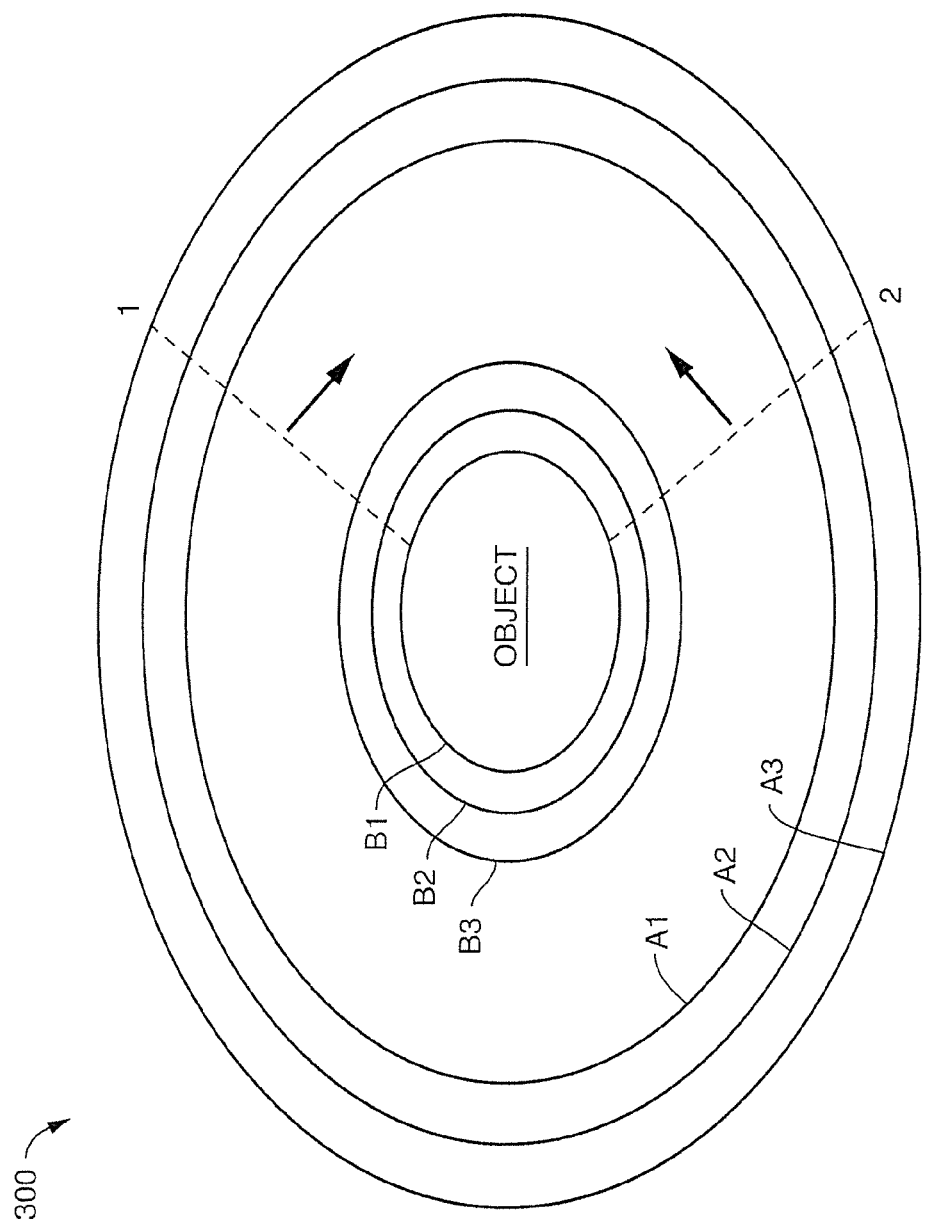
FIG. 3 depicts a diagrammatic plan view of a resonator cloaking system utilizing a number of shells having an elliptical cross-section, in accordance with an alternate embodiment of the present disclosure.

FIG. 3 depicts a diagrammatic plan view of a cloaking system (or electrical resonator system) according to an alternate embodiment in which the individual shells have an elliptical cross section. As shown in FIG. 3, a system 300 for cloaking can include a number of concentric shells (or bands) 302. These shells can be held in place with respect to one another by suitable fixing means, e.g., they can be placed on a platform (parallel to the plane of the drawing) and/or held with a frame. The shells 302 can include a flexible substrate (e.g., polyimide with or without composite reinforcement) with a close-packed arrangement of electrically conductive material formed on the first surface. As stated previously for FIG. 2, the closed-packed arrangement can include a number of self-similar electrical resonator shapes. The resonator shapes can be made from conductive traces (e.g., copper, silver, gold, silver-based ink, etc.) having a desired shape, e.g., fractal shape, split-ring shape, and the like. The shells 302 can surround an object to be cloaked, as indicated in FIG. 3.

As indicated in FIG. 3 (by dashed lines 1 and 2 and arrows), the various shells themselves do not have to form closed surfaces. Rather, one or more shells can form open surfaces. This can allow for preferential cloaking of the object in one direction or over a given angle (solid angle). Moreover, while dashed lines 1 and 2 are shown intersecting shells B1-B3 and A1-A3 of system 300, one or more shells of each group of shells (B1-B3 and A1-A3) can be closed while others are open. Additionally, it should be appreciated that the cross-sections shown for each shell can represent closed geometric shapes, e.g., spherical and ellipsoidal shells.

As indicated previously, each shell of a cloaking system (e.g., system 300) include multiple resonators in one or multiple close-packed configurations. The resonators can be repeated patterns of conductive traces. These conductive traces can be closed geometric shapes, e.g., rings, loops, closed fractals, etc. The resonator(s) can be self similar to at least second iteration. The resonators can include split-ring shapes, for some embodiments. The resonant structures are not required to be closed shapes, however, and open shapes can be used for such.

In exemplary embodiments of shell 300, the closed loops can be configured as a fractals or fractal-based shapes, e.g., as depicted by fractal cells 110 and 120 in FIG. 1. The dimensions and type of a fractal shape for a fractal cell can be the same for each shell type but can vary between shell types. This variation (e.g., scaling of the same fractal shape) can afford increased bandwidth for the cloaking characteristics of the system. This can lead to periodicity of the fractal shapes of common shell types but aperiodicity between the fractal shapes of different shell types.

It will be appreciated that the resonant structures of the shells may be formed or made by any suitable techniques and with any suitable materials. For example, semiconductors with desired doping levels and dopants may be used as conductive materials. Suitable metals or metal containing compounds may be used. Suitable techniques may be used to place conductors on/in a shell, including, but no limited to, printing techniques, photolithography techniques, etching techniques, and the like.

It will also be appreciated that the shells may be made of any suitable material(s). Printed circuit board materials may be used. Flexible circuit board materials are preferred. Other material may, however, be used for the shells and the shells themselves can be made of non-continuous elements, e.g., a frame or framework. For example, various plastics may be used. In exemplary embodiments, the undelying surface or substrate on which a FPS is formed can have low loss with respect to the type of radiation that the FPS is designed for, so as to facilitate the intended heat and/or power transfer or dissipation.

Exemplary embodiments of the present disclosure can provide techniques, including systems and/or methods, for providing a radar cross section of different sizes than as would otherwise be dictated by the physical geometry of an object. Such techniques (objects/methods) can be useful for implementations such as radar decoys where a given object (decoy) is made to appear in radar cross section as like another object (e.g., missile). Representative frequencies of operation can include those over a range of 500 MHz to 1.3 GHz, though others may of course be realized. Other frequencies, include those of visible light may be realized, e.g., by appropriate scaling of dimensions and selection of shape of fractal elements.

Figure 4A:
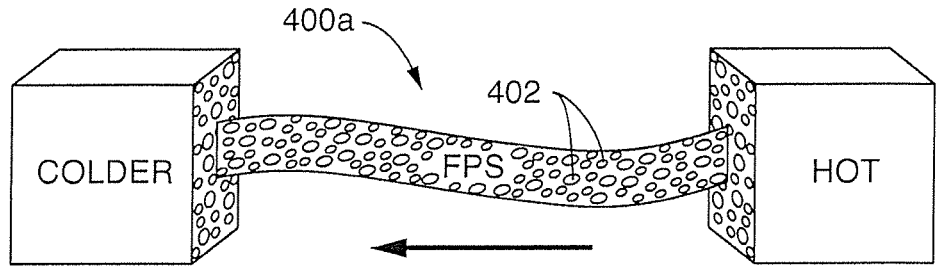
FIGS. 4A-4C depict an example of a FPS in three different configurations.
Figure 4B:
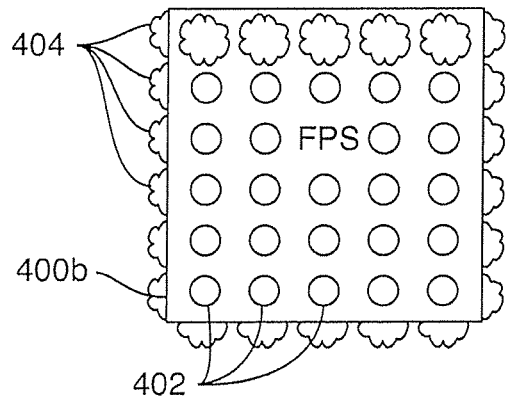
Figure 4C:
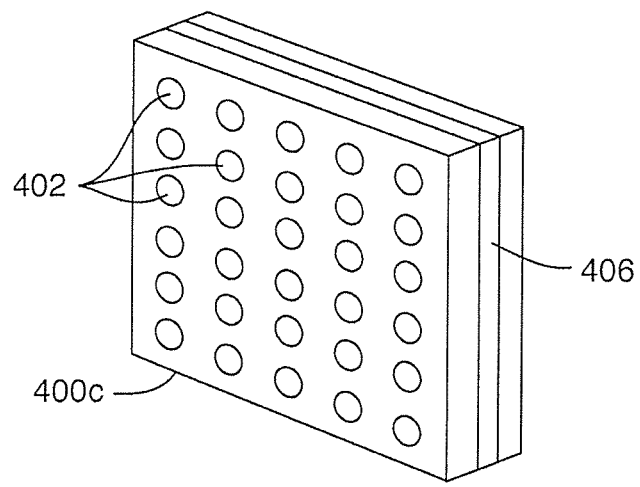

FIGS. 4A-4C depict an example of a FPS 400 in three different configurations. In FIG. 4A, the FPS 400A is shown physically coupled between two objects, a hot object and a colder object. Heat, in the form of radiative infrared energy, flows from the hot object to the colder object via plasmonic coupling between fractal cells 402 of the FPS 400A.

FIG. 4B, a configuration of FPS 400B is shown having resistive ends 404 in addition to the fractal cells 402. The resistive ends 404 may be made of any suitable resistive material and my any suitable techniques. Such resistive ends may be useful for power dissipation in some applications. FIG. 4C shows another embodiment of FPS 400C that has a resistive layer or edge 406 instead of the resistive ends 404 shown previously (though both such resistive elements may be used for a single FPS).

Figure 5:
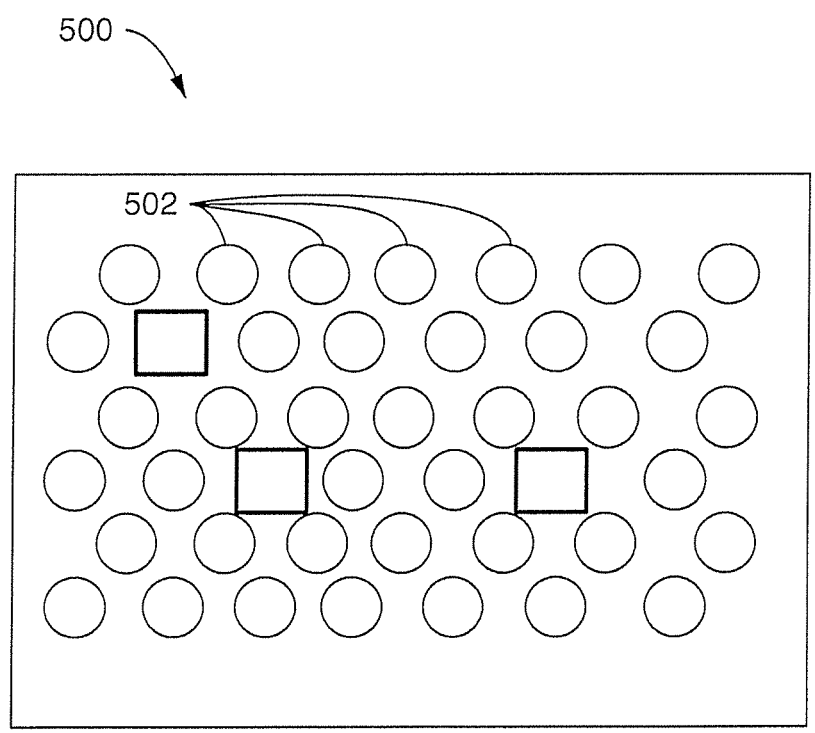
FIG. 5 illustrates the robustness or anti-fragility presented by a FPS under conditions where some fractal cells are damaged or otherwise inoperative.

FIG. 5 illustrates the robustness or anti-fragility presented by a FPS 500 under conditions where some fractal cells are damaged or otherwise inoperative. As shown, FPS 500 has a close-packed arrangement of fractal cells, indicated by circles 502. The close-packed arrangement provides many paths by which energy may be transferred from one area of the FPS to another, even in the presence of damaged or otherwise inoperative fractal cells (represented by the black squares shown).

Figure 6:
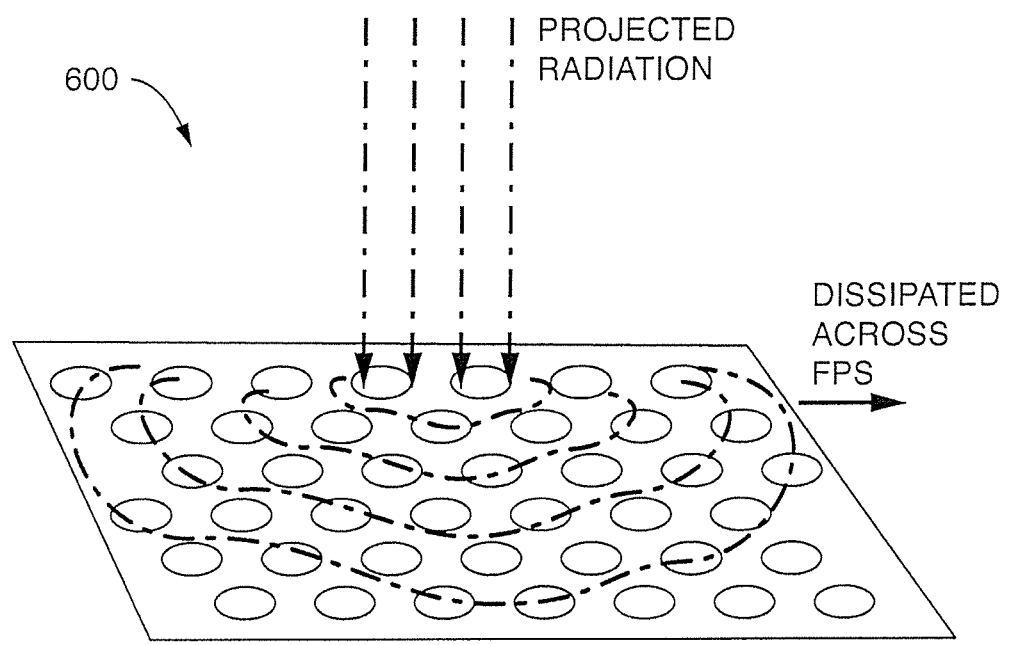
FIG. 6 depicts an example of a FPS used to dissipate incident radiation.

FIG. 6 depicts an example of a FPS 600 used to dissipate incident radiation, which may be directed radiation of high intensity or fluence. As shown, radiation that is incident on a localized area of the FPS 600 is dissipated (indicated by concentric rings) across the surface of the FPS 600 via plasmonic coupling and radiative transfer between the fractal cells 602 of the FPS 600.

While embodiments are shown and described herein as having shells in the shape of concentric rings (circular cylinders), shells can take other shapes in other embodiments. For example, one or more shells could have a generally spherical shape (with minor deviations for structural support). In an exemplary embodiment, the shells could form a nested arrangement of such spherical shapes, around an object to be shielded (at the targeted/selected frequencies/wavelengths). Shell cross-sections of angular shapes, e.g., triangular, hexagonal, while not preferred, may be used.

One skilled in the art will appreciate that embodiments and/or portions of embodiments of the present disclosure can be implemented in/with computer-readable storage media (e.g., hardware, software, firmware, or any combinations of such), and can be distributed and/or practiced over one or more networks. Steps or operations (or portions of such) as described herein, including processing functions to derive, learn, or calculate formula and/or mathematical models utilized and/or produced by the embodiments of the present disclosure, can be processed by one or more suitable processors, e.g., central processing units ("CPUs) implementing suitable code/instructions in any suitable language (machine dependent on machine independent).

While certain embodiments and/or aspects have been described herein, it will be understood by one skilled in the art that the methods, systems, and apparatus of the present disclosure may be embodied in other specific forms without departing from the spirit thereof For example, while certain wavelengths/frequencies of operation have been described, these are merely representative and other wavelength/frequencies may be utilized or achieved within the scope of the present disclosure.

Furthermore, while certain preferred fractal generator shapes have been described others may be used within the scope of the present disclosure. Accordingly, the embodiments described herein are to be considered in all respects as illustrative of the present disclosure and not restrictive.

What is claimed is:

1. An electromagnetic radiative system providing gain over a prescribed bandwidth, the system comprising:
   a plurality of fractal-cell layers, each layer having a fractal plasmonic surface (FPS) including close-spaced fractal cells, wherein the plurality of fractal-cell layers is operative to produce a gain increase, and wherein the gain increase acts as a lens-like effect on a separate electromagnetic source; and
   wherein the fractal cells lie on a flat layer and the system comprises one or more flat layers for wide bandwidth or multibandwidth transmission.

2. The electromagnetic radiative system of claim 1, wherein each layer holding a FPS comprises fractal cells of different size and shape than those of another layer.

3. The electromagnetic radiative system of claim 1, wherein the fractal cells lie on a curved layer and the system includes one or more curved layers for wide bandwidth or multibandwidth at transmission.

4. The electromagnetic radiative system of claim 3, wherein each layer holding a FPS comprises fractal cells of different size and shape than those of another layer.

5. The electromagnetic radiative system of claim 1, wherein the fractal cells comprise a plurality on the area of each layer, but do not fully populate the layer area.

6. The electromagnetic radiative system of claim 1, wherein the absence of fractal cells on the layer constitutes concentric shells as rings.

7. The electromagnetic radiative system of claim 3, wherein the fractal cells constitute a plurality on the area of each layer, but do not fully populate the layer area.

8. The electromagnetic radiative system of claim 3, wherein the absence of fractal cells on the layer constitutes concentric shells as rings.

* * * * *